United States Patent [19]
Questel et al.

[11] Patent Number: 5,323,993
[45] Date of Patent: Jun. 28, 1994

[54] MOLDED PLASTIC LOAD-BEARING SUPPORT DEVICE

[75] Inventors: John M. Questel; Daniel T. Pogany, both of Cuyahoga Falls, Ohio; Thomas E. Lakinger, Chicago; David F. Koeneman, Mt. Prospect, both of Ill.

[73] Assignee: Selfix, Inc., Chicago, Ill.

[21] Appl. No.: 74,200

[22] Filed: Jun. 10, 1993

Related U.S. Application Data

[63] Continuation of Ser. No. 791,500, Nov. 12, 1991, abandoned.

[51] Int. Cl.$^5$ ............................................. A47F 7/14
[52] U.S. Cl. ........................... 248/205.3; 248/205.4; 248/304; 248/467; 248/489; 248/915; 211/87; 211/105.1; 428/247; 428/254
[58] Field of Search ............... 248/205.3, 205.4, 304, 248/467, 489, 915; 211/87, 105.1; 428/350, 354, 343, 247, 254, 261, 288, 289

[56] References Cited

U.S. PATENT DOCUMENTS

| | | | |
|---|---|---|---|
| 3,504,878 | 4/1970 | Dressler | 248/489 X |
| 3,560,247 | 2/1971 | Robinson | 428/350 |
| 3,616,146 | 10/1971 | Gabet | 428/354 X |
| 3,900,059 | 8/1975 | Kirk et al. | 248/205.3 X |
| 4,067,532 | 1/1978 | Viteretto | 248/205.3 X |
| 4,181,553 | 1/1980 | Hogg | 428/350 X |
| 4,310,137 | 1/1982 | Frye | 248/205.3 X |
| 4,466,787 | 8/1984 | Ragir et al. | 264/257 X |
| 4,470,523 | 9/1984 | Spector | 248/205.3 X |
| 4,524,939 | 6/1985 | Hogg | 248/467 |
| 4,705,715 | 11/1987 | DeCoste, Jr. et al. | 428/354 X |
| 4,740,416 | 4/1988 | DeCoste, Jr. et al. | 428/354 X |
| 4,937,138 | 6/1990 | Mostert | 428/288 X |
| 5,121,896 | 6/1992 | Frye | 248/467 |

*Primary Examiner*—Daniel Zirker
*Attorney, Agent, or Firm*—Dressler, Goldsmith, Shore & Milnamow, Ltd.

[57] ABSTRACT

A molded plastic load-bearing support device with an adhesive coated fabric backing member is disclosed. The fabric backing member is adhesive coated so that the molded plastic, load-bearing support device will adhere to a surface. The fabric backing member is integrally associated with the molded plastic load-bearing support device. The adhesive coating at least partially penetrates the surface of the fabric backing member.

21 Claims, 1 Drawing Sheet

MOLDED PLASTIC LOAD-BEARING SUPPORT DEVICE

This application is a continuation of application Ser. No. 07/791,500, filed Nov. 12, 1991, now abandoned.

TECHNICAL FIELD

This invention relates generally to self-adhering support devices such as hooks and the like, and more particularly to a load-bearing support device with a fabric backing member coated with a moisture-activated adhesive by which the load-bearing support device can be affixed to a surface.

BACKGROUND

Various types of self-adhering support devices, such as utility hooks, soap dishes, towel bars, bathroom fixtures, and the like, have proven very popular with consumers for household use. These types of devices ordinarily include adhesive material preapplied to a rearwardly facing surface of the device, thus facilitating convenient mounting on surfaces such as walls or doors. One particularly successful construction is illustrated in U.S. Pat. No. 3,504,878 to Dressler.

Load-bearing support devices can be adhesively affixed to a surface in a variety of ways. One particularly effective manner includes the provision of a hydrophilic substrate coated with a moisture-activated adhesive, with the substrate bonded to the device such as by molding the device directly against the substrate. When the moisture-activated adhesive is moistened it will bond with the surface to which it is attached. When the adhesive dries, it "sets up" or cures, and firmly adheres to the surface. However, in order for the adhesive to cure and set up effectively, the adhesive must dry thoroughly. If the moisture-activated adhesive is applied to a hydrophilic or porous substrate, evaporation of water from the adhesive after the device has been applied to a surface is facilitated. In fact, without this type of porous substrate, the adhesive will probably not dry sufficiently after the device is affixed to a surface for the device to support significant loads. Fibrous inserts made of materials such as wood have been used as hydrophilic substrates that permit the evaporation of moisture from the moisture-activated adhesive coated substrate after the device is affixed to a surface.

Nevertheless, use of fibrous inserts as the adhesive backing for load-bearing substrates can be problematic. If the fibrous insert is warped or is otherwise not flat, it will not fully contact the surface on which the load-bearing support device is mounted. This reduces the strength of adhesion between the load-bearing support device and the surface to which it is attached. Although wood veneer is commonly employed as a fibrous backing member or insert for load carrying support devices, wood warpage is a common problem. Wood has a tendency to warp when exposed to changes in temperature or when moisture evaporates from the wood. Moreover, this warpage problem becomes more acute as the size of the fibrous inserts increases.

Additionally, when molten synthetic material is used to form the load-bearing support device and it cools to form the molded support device, the slight changes in configuration and dimension which accompany this cooling also tend to warp the wood backing member.

Even when an automated apparatus, such as disclosed in U.S. Pat. No. 4,466,787 to Ragir et al., is employed to substantially concurrently cut, position and bond wood backing members to support devices, warpage of the wood backing materials imposes constraints upon the efficiency of manufacture. To abate warpage, the adhesive is not applied to the wood backing prior to it being applied to the support device, because evaporation of the moisture from the adhesive warps the wood. This warpage problem is avoided by applying the adhesive onto the wood after it is bonded to or formed as a part of the support device.

Since it is more expensive, time-consuming and complex to apply the adhesive onto the wood backing member of individual support devices, rather than apply adhesive to large rolls of wood prior to cutting and bonding of the individual wood inserts, wood backing members that have a tendency to warp when dried are a significant impediment to a streamlined, efficient process for producing these types of relatively low-cost consumer articles.

SUMMARY OF THE INVENTION

A molded plastic, load-bearing support device with a pliable fabric backing member is disclosed. The fabric backing member has two expansive surfaces, one of which is coated with a moisture-activated adhesive coating. The other surface is substantially integrally associated with the molded plastic, load-bearing support device. The adhesive coated, fabric backing member is affixed to the load-bearing support device during an injection molding process in which the load-bearing support device is formed.

The fabric backing member is a fabric made of fibrous material, with exposed loose fiber free end portions of the fibrous material substantially surrounded by the molded plastic article and embedded therein. The fabric material is preferably a woven substrate on which the moisture-activated adhesive is pre-applied in a highly efficient and cost-effective manner. The woven substrate preferably exhibits a breaking strength of at least about 100 lbs. in the warp direction and at least about 50 lbs. in the fill direction. The woven substrate has a tearing strength of at least about 5 lbs. in the warp direction and at least about 3 lbs. in the fill direction. The woven substrate is preferably made of natural, as opposed to synthetic, fibers, and those fibers are preferably cotton fibers.

The moisture-activated adhesive coating is applied as a thin layer onto the large rolls of the fabric from which the fabric backing members are obtained and is at least partially absorbed by the fabric. The moisture-activated adhesive coating has a viscosity which is selected to promote even application of the adhesive over the fabric. The moisture content of the moisture-activated adhesive coating is sufficiently high to permit the adhesive coating to at least partially penetrate the fabric when applied thereto, and sufficiently low to enable the adhesive to evaporate quickly from the fabric after it is applied thereto.

The method by which the load-bearing support device is manufactured first requires providing a substantially continuous length of fabric which is preferably made of woven, natural fibers, preferably cotton fibers. A moisture-activated adhesive is applied substantially continuously along the length of the fabric to form a continuous strip of adhesive coated fabric. The viscosity of the adhesive is selected to enable the adhesive to be spread evenly over the fabric. The length of the substantially continuous length of coated fabric is then divided along the width thereof to provide a plurality of adhesive coated fabric strips.

The strips of adhesive coated fabric are then directed into operative association with an injection molding apparatus. A discrete length of the coated fabric is severed from the strip. The injection molding apparatus is operated to mold a plastic article and simultaneously apply the desired length of adhesive coated fabric to the molded article.

Other features and advantages will be apparent from the following detailed description, the accompanying drawings, and the appended claims.

DESCRIPTION OF THE PREFERRED EMBODIMENTS

Figure 1:
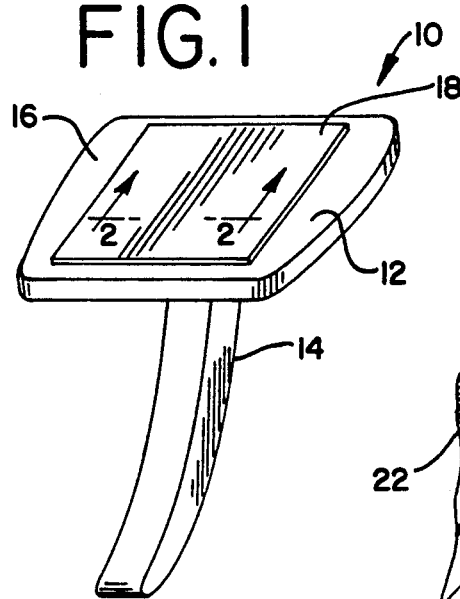
FIG. 1 is rear perspective view of a finished molded plastic support device having an adhesive coated fabric backing member integrally associated therewith.

While the present invention is susceptible to embodiment in various forms, there is illustrated in the drawings and hereinafter described a presently preferred embodiment, with the understanding that the present disclosure is intended as an exemplification of the invention, and is not intended to limit the invention to the specific embodiment illustrated.

As described in detail hereinafter, the present invention contemplates a molded plastic support device, such as a hook, or the like, which includes an integral, adhesive bearing fabric insert member.

When fabric materials are used as backing members for such load-bearing support devices, the disadvantages of wooden backing materials can be avoided while providing at least the equivalent load-bearing strength obtained through the use of wooden backing materials.

Manufacturing efficiency is promoted since fabric can be purchased in wide rolls or bolts, is not as fragile as previously used wood veneers, and is easier to handle because there are no injurious splinters associated with fabric. Since fabric can be processed on high speed coating machines, the processing advantages over wood are significant. Perhaps most significantly, wetted fabric does not warp when dried, thus permitting an adhesive layer to be applied to the fabric prior to the fabric backing being assembled with the molded load-bearing device. The processing advantages of continuously applying adhesive to large amounts of product materials, versus the previous practice of applying adhesive to the backs of individual molded, load-bearing devices by hand, are readily apparent. Manual manipulation of the fabric backed devices is not required after molding. Not only can the adhesive be applied quickly and more efficiently, it can also be applied more uniformly.

Referring to FIG. 1, the molded, load-bearing support device 10 of the present invention is made up of a molded base article 12 which is preferably made of plastic or some other material that can be formed using an injection molding apparatus. The base article 12 typically has a load-bearing surface 14 (FIG. 2) and a rear surface 16. A fabric backing member 18 is integrally associated with the rear surface 16 of the base article 12. The fabric backing member 18 has an adhesive layer 20 applied thereto on the rearwardly and outwardly facing surface of the fabric. The adhesive layer 20 at least partially penetrates the fabric backing member 18.

Figure 2:
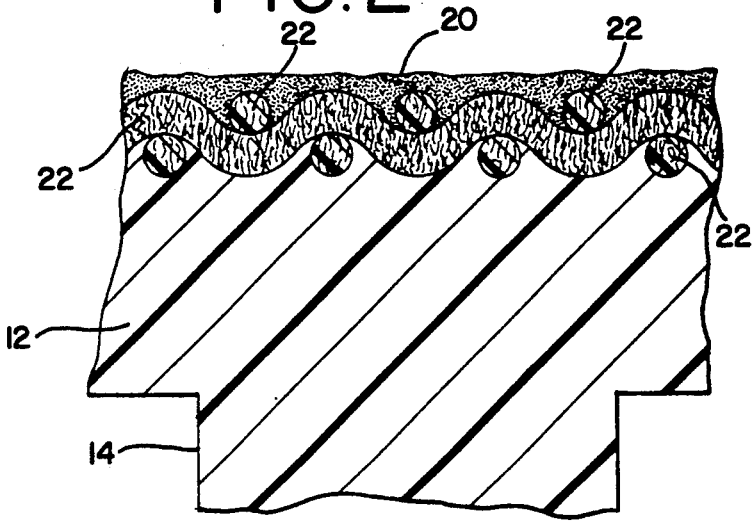
FIG. 2 is a greatly enlarged cross-sectional view of a finished molded plastic device taken along line 2—2 of FIG. 1.

The fabric backing member 18 is preferably woven. FIG. 2 illustrates the woven nature of the fabric backing member 18 by illustrating the individual threads or strands 22 of the woven backing member 18. The woven nature of the fabric backing member 18 allows the adhesive layer 20 to at least partially penetrate the fabric backing member 18 and, by virtue of the relatively large exposed surface area, permits the adhesive to surround portions of at least some of the fabric strands 22. Similarly, the woven nature of the backing member 18 also permits the individual strands 22 of the fabric backing member 18 to intimately bond with the rear surface 16 of the molded article 12 as the network of exposed strands is surrounded by plastic. This bonding is promoted by the embedding of individual fibers of the fabric strands in the plastic material during molding.

In this regard a fibrous fabric is preferred since there are sufficient exposed, loose fiber free end portions to permit at least some of the fibers in the backing member to be intimately associated and bonded with the molten article to which the backing member is applied. Attendant to molding, at least some of these fiber end portions are substantially surrounded by molten plastic material and become embedded therein. The fabric backing member is preferably selected to be sufficiently flexible to conform to the molded plastic device during molding. It is believed that the relatively great surface area presented by the woven fabric promotes secure bonding of the plastic article to the substrate.

The woven fabric is selected to exhibit sufficient porosity so that a portion of the adhesive applied to the surface thereof is at least partially absorbed into the individual strands 22 of the fabric, thus promoting the load-bearing strength of the device 10 after mounting for use.

The woven fabric is characterized by a breaking strength of at least about 100 lbs. in the warp (machine) direction and at least about 50 lbs. in the fill (cross) direction. The woven substrate has a tearing strength of at least about 5 lbs. in the warp direction and at least about 3 lbs. in the fill direction. The thickness of the fabric is preferably at least about 10 mils.

The thickness of the fabric is minimized to enable the load-bearing support device to be as close as possible to the surface on which it is mounted. Yet the fabric must be thick enough to provide sufficient load-bearing strength. Testing has shown that a suitable fabric at least 10 mils thick has sufficient load-bearing strength. A thickness of 26 mils is preferred. If the fabric is too thin, it will be too easily pulled from the load-bearing support device. For example, a 100 percent broadcloth backing member that was 9 mils thick pulled relatively easily from the load-bearing support device on which it was tested. Similarly, a variety of papers were tested and found to exhibit insufficient strength to be useful as backing members for load-bearing support devices.

An adhesive coating with a thickness of about 7 to about 15 mils is applied to the fabric. The adhesive coating is a standard moisture-activated adhesive which is known to those skilled in the art.

Figure 3:
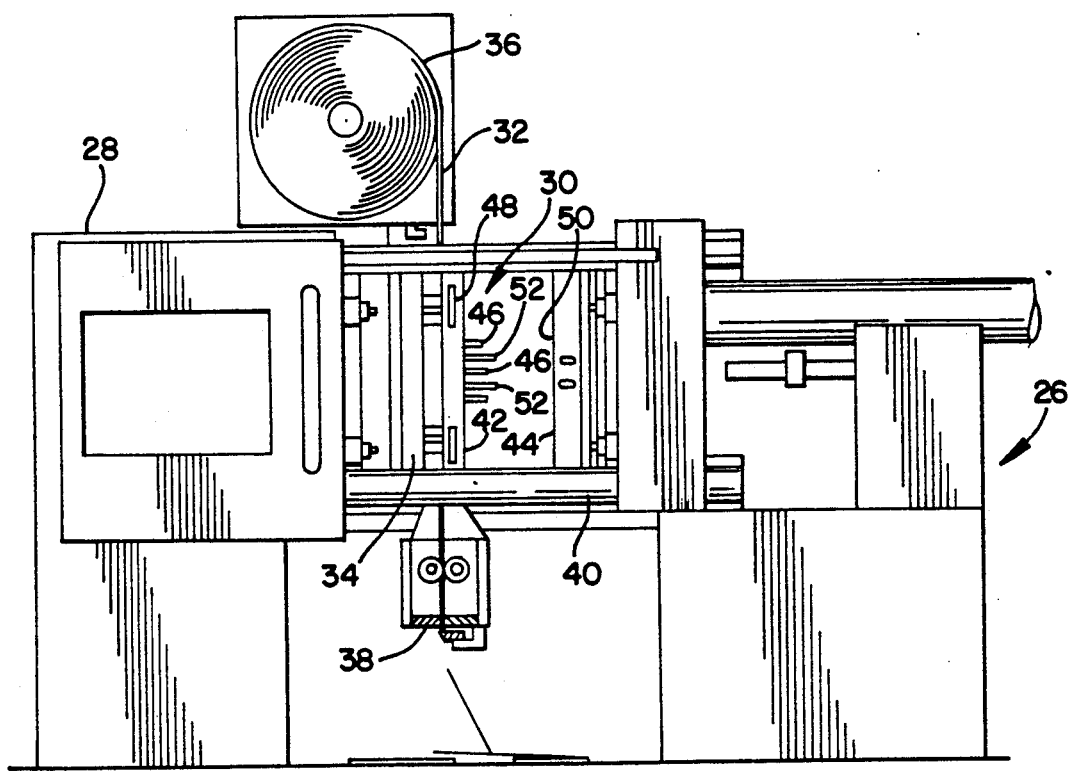
FIG. 3 is a side elevational diagrammatic view of an apparatus for practicing the present invention.

FIG. 3 illustrates generally the injection molding apparatus used to associate the fabric backing member with the molded load-bearing device. The apparatus includes an injection molding machine 26 having a frame generally designated 28 and a molding die assembly generally designated 30. The construction and operation of injection molding machines such as 26 is known and will be readily appreciated by those familiar with the art.

According to the present invention, one or more continuous strips 32 of adhesive coated fabric are provided for advancement into association with a punch and die mechanism 34. Each strip of adhesive coated fabric backing material 32 is preferably provided from a roll 36.

The present apparatus further includes a feed roller mechanism, designated 38, which is arranged to draw the one or more strips of fabric backing material 32 through the punch and die mechanism 34 of the apparatus. The feed roller mechanism 38 is preferably carried by one of the mold portions of the molding die assembly 30, and includes features which facilitate smooth, intermittent advancement of strips 32 of backing material through punch and die mechanism 34.

The frame 28 of molding machine 26 is provided with suitable slides or track members 40 that guide the advancement of a reciprocalably moveable male mold die member or portion 42 of molding die assembly 30. Male mold die portion 42 is movable into and out of registry with a female mold die member or portion 44 of molding die assembly 30. Advancement and retraction of male mold portion 42 is controlled by any suitable power means (not shown) working in conjunction with conventional sequential control means (not shown). A number of pilot pins 46 project from the face of male mold portion 42 and register with apertures provided in female mold portion 44 to assure proper alignment of the mold portions 42 and 44 when they are brought into registry.

Both the male and female mold portions 42 and 44 are provided with suitable fluid conduits 48 which are connected to a source of molten plastic material. The molten plastic material is supplied by suitable means under pressure to fill one or more mold cavities 50 defined by male and female mold portions 42 and 44 during the article forming process. The molding die assembly 30 includes forming projections 52 which project from the face of male mold portion 42, and which are provided for formation of a typical device such as illustrated in FIG. 1.

EXAMPLE 1

COMPARISON OF PHYSICAL PROPERTIES OF COTTON FABRIC AND WOOD

The properties of a woven cotton fabric, uncoated duck cloth, were compared with the properties of uncoated wood and the properties of the two materials are enumerated in Table 1. The weight and moisture content of the cotton fabric were somewhat less than the weight and moisture content of the wood.

Moisture uptake was measured by weighing equal size samples of cloth and wood substrates and placing them in an environment where the temperature was 100° F. at 95 to 100 percent relative humidity. Some of the samples were laminated on both sides with a polypropylene film leaving only the edges exposed. As can be seen from Table 1, the cloth did not have a significantly greater tendency to absorb moisture than the wood. The moisture uptake of the cloth is somewhat greater than the moisture uptake of the wood, however, which indicates that the cloth may absorb slightly more adhesive than wood.

TABLE 1

| COMPARISON OF WOOD & FABRIC SUBSTRATES | | |
|---|---|---|
| | WOOD | FABRIC |
| Thickness (mils) | 26 | 26 |
| Weight (g/in$^2$) | 234 | 223 |
| Moisture content (wt. %) | 8.6 | 6.2 |
| Moisture uptake 2 hr.(wt. %) | 21.9 | 22.6 |
| Moisture uptake 24 hr.(wt. %) | 23.3 | 24.7 |
| Moisture uptake 24 hr.(wt. %) Edge exposure only | 14.2 | 16.1 |
| Tensile Strength (lbs/in) | | 42.3 |
| Wet Tensile (lbs/in) | . | 43.2 |
| % Elongation | | 15 |

EXAMPLE 2

PREPARATION OF A LOAD-BEARING ARTICLE WITH A MOISTURE-ACTIVATED ADHESIVE COATED BACKING

A 60 inch wide roll of "A" grade, singlefill, duck cloth with a basis weight of 10 oz/yd$^2$ was selected as the fabric for the backing members for the molded support article of the present invention. The cloth was supplied by Schott International, Inc. of Akron, Ohio. The duck cloth was made of natural cotton fabric that was not preshrunk, pretreated or sized. The duck cloth was woven with a thread count of 76×28 per square inch. Its breaking strength was 182 pounds in the warp (machine) direction and 109 pounds in the fill (cross) direction.

The tensile strength of the fabric was 93 lbs/in in the machine direction. The fabric had an elongation of 33 percent at its breaking point in the machine direction and 13 percent elongation in the cross direction. The tensile strength of the fabric was measured as 62 lbs/in in the cross direction. When immersed in water, the cloth absorbed 25 percent of its dry weight of water.

The cotton duck cloth was approximately 26 mils thick. A water activated adhesive was applied onto the duck cloth by running the cloth continuously under a knife-type coater while the adhesive was continuously applied to the fabric upstream of the knife coater. The knife coater applied an even coating of adhesive onto the duck cloth.

The adhesive applied was a Bond-Plus TM 347-M remoist adhesive which was obtained from Industrial Adhesives located in Chicago, Ill. Bond Plus 347-M is a water based adhesive that is a mixture of polyvinyl acetate, polyvinyl alcohol and wetting agents suspended in water. The amount of adhesive applied was sufficient to provide an adhesive layer on the duck cloth that was about 11 mils thick.

The coated duck cloth was dried and cut into lengthwise strips to form multiple rolls with a width of about 2½ inches. The rolls of coated duck cloth strips were placed on an injection molding machine as described generally above, and the duck cloth was integrated with and bonded to molten plastic to form molded plastic articles.

The molded plastic articles Were allowed to cool. The resultant articles were then tested to determine their adhesive strength under load. As a basis for comparison, molded plastic articles with wood backing strips such as those disclosed in U.S. Pat. No. 4,466,487 to Ragir et al. were also prepared. In accordance with the usual practice, a moisture-activated adhesive was applied by hand to the wood veneer backing after the molded load-bearing support device was formed, since the wood would have been subject to warpage if the adhesive was applied to the wood prior to the wood being bonded to the molded article in the injection molding apparatus. The adhesive applied to the wood backing was the same as the adhesive used to coat the fabric.

The adhesive on each device was activated with two drops of water, and the fabric and wood veneer-backed load-bearing support devices were applied, by the application of manual pressure, onto ceramic wall tile.

The relative strength of the fabric and wood veneer-backed load-bearing support devices was measured after exposing the device to a variety of conditions, either before the adhesive was activated and the device as applied to the ceramic tile (designated as unapplied) or after the device was applied to the ceramic tile (designated as applied). The devices, both applied and unapplied, were subjected to these conditions for periods of time varying from 24 hours up to 3 weeks.

The relative strength of the fabric and wood veneer-backed load-bearing support devices was determined by measuring the cantilever shear strength between each load support device and the ceramic tile to which the devices were attached. The cantilever shear strength was measured at a jaw separation rate of 0.2 inches per minute. The average test results for the thirty individual devices evaluated under each of the enumerated conditions are reported in Table 2 below.

The adhesive was dried under humid and ambient conditions. The temperature to which the adhesive fabric and wood veneer-backed devices were exposed while the adhesive was setting up was also varied to determine the effect of temperature on cantilever shear strength. At a temperature of 150° F., the cantilever shear strength of both the fabric and wood veneer-backed devices was higher than the shear strength of devices which were exposed to lower temperatures while the adhesive was setting up. The fabric-backed devices had noticeably greater cantilever shear strength at higher temperature than the wood veneer-backed devices, whether the devices were applied or unapplied.

TABLE 2

RELATIVE CANTILEVER SHEAR STRENGTH OF FABRIC AND WOOD-BACKED LOAD-BEARING SUPPORT DEVICE

|  | FABRIC (LBS.) | WOOD (LBS.) |
| --- | --- | --- |
| Initial 24 hr. dwell | 91.6 | 125.5 |
| 24 hr. @ 100° F./95% RH, unapplied | 15.5 | 19.1 |
| 24 hr. @ 100° F./95% RH, unapplied | 35.8 | 85.6 |
| 1 wk. @ 150° F., unapplied | 105.3 | 96.4 |
| 1 wk. @ 150° F., applied | 198.8 | 173.5 |
| 3 wks. @ 150° F., unapplied | 94.2 | 90.1 |
| 3 wks. @ 150° F., applied | 257 | 194 |
| 72 hrs. ambient, applied | 88.6 | 89.6 |
| 72 hrs. ambient, applied | 72.5 | 82.1 |
| 72 hrs. ambient (avg.) | 80.6 | 86 |
| 72 hrs. high humidity, applied | 56.3 | 77.2 |
| 72 hrs. high humidity, applied | 12.5 | 35.9 |
| 72 hrs. high humidity (avg.) | 34.4 | 56.6 |

Both that wood veneer and fabric-backed load-bearing support devices had mixed modes of failure. The larger percentage of the wood veneer-backed devices failed at the tile to adhesive interface while most of the other wood veneer-backed devices failed at the wood to plastic interface. The fabric-backed devices also exhibited a mixed mode of failure, but, significantly, none failed at the cloth to plastic interface.

Most of the fabric-backed devices failed at the tile to adhesive interface, although in a few instances the tile itself failed.

A plastic load-bearing support device without either the fabric or wood veneer backing, nor any other hydrophilic absorber was also tested and found to have a cantilever shear strength of less than 10 pounds compared with an average of 90 pounds of shear strength for the fabric or wood-backed articles. Clearly the hydrophilic absorber provides an avenue for migration of the moisture from the adhesive, allowing it to more thoroughly cure and thus adhere more firmly than if the water is not allowed to diffuse from the adhesive.

From the foregoing, it will be observed that numerous variations and modifications may be effected without departing from the true spirit and scope of the present invention. It will be understood that no limitation with respect to the specific apparatus illustrated herein is intended or should be inferred. It is, of course, intended to cover by the appended claims all such modifications that fall within the scope of the claims.

What we claim is:

1. A load-bearing support device comprising:
   a molded plastic article and a substantially pliable fabric backing member of fibrous material with exposed loose fiber free end portions, said backing member having a first expansive surface and a second expansive surface, the first expansive surface being substantially integrally associated with the molded support article with the exposed loose fiber free end portions of the fibrous material being substantially surrounded by plastic material of the molded article and embedded therein, and the second expansive surface being substantially coated with an adhesive layer which at least partially penetrates the second surface of the fabric backing member;
   said fabric backing member having a breaking strength of at least about 100 lbs. in the warp direction and at least about 50 lbs. in the fill direction and a tearing strength of at least about 5 lbs. in the warp direction and at least about 3 lbs. in the fill direction.

2. The load-bearing support device of claim 1 wherein the fabric backing member is a woven fabric.

3. The load-bearing support device of claim 2 wherein the woven fabric is made of natural fibers.

4. The load-bearing support device of claim 3 wherein the natural fibers are cotton fibers.

5. The load-bearing support device of claim 3 wherein the woven fabric backing member has a thread count of about 76×28 per square inch.

6. The load-bearing support device of claim 1 wherein the fabric backing member has a thickness of at least about 10 mils.

7. The load-bearing support device of claim 6 wherein the fabric backing member has a thickness of about 26 mils.

8. The load-bearing support device of claim 1 wherein the adhesive layer has a thickness of about 7 mils to about 15 mils.

9. The load-bearing support device of claim 1 wherein the tensile strength of the fabric backing member is about 93 lbs. per inch in the machine direction and about 62 lbs. per inch in the fill direction.

10. A load-bearing support device comprising:
a molded plastic article and a woven fabric backing comprising fibrous material with exposed loose fiber free end portions, the exposed loose fiber free end portions of the fibrous material being substantially surrounded by plastic material of the molded article and embedded therein, the fabric backing member having a first expansive surface and second expansive surface, the first expansive surface being substantially integrally associated with the molded plastic article and the second expansive surface being coated with a layer of moisture-activated adhesive that at least partially penetrates the second expansive surface of the fabric backing member, said fabric backing member having a breaking strength of at least about 100 lbs. in the warp direction and at least about 50 lbs. in the fill direction and a tearing strength of at least about 5 lbs. in the warp direction and at least about 3 lbs. in the fill direction.

11. The load-bearing support device of claim 10 wherein the fabric backing member has a thickness of about 26 mils.

12. A load-bearing support device comprising:
a molded plastic support member;
a woven fabric backing member made of a fibrous material with exposed loose fiber free end portions, the woven fabric backing member having a front surface and a back surface with the exposed loose fiber free end portions of the front surface being at least partially integrally associated with the molded plastic support member; and
an adhesive layer coated upon the back surface of the woven fabric backing member which, when affixed to a substantially planar and rigid surface, enables the support device to bear a load while remaining affixed to the substantially planar and rigid surface;
said fabric backing member having a breaking strength of at least about 100 lbs. in the warp direction and at least about 50 lbs. in the fill direction and a tearing strength of at least about 5 lbs. in the warp direction and at least about 3 lbs in the fill direction.

13. The load-bearing support device of claim 12 wherein the fabric backing member has a thickness of at least about 10 mils.

14. The load-bearing support device of claim 12 wherein the adhesive layer has a thickness of about 7 mils to about 15 mils.

15. A load-bearing support device comprising:
a support article and a substantially pliable fabric sheet backing member that is a woven fabric comprising fibrous material with exposed loose fiber free end portions, the substantially pliable fabric sheet backing member having a first surface and a second surface, at least some of the loose fiber free end portions of the first surface being at least partially surrounded by the support article and embedded therein, and the second surface being substantially coated with an adhesive layer which at least partially penetrates the second surface of the fabric sheet backing member, wherein the fabric sheet backing member has a thickness at least about 10 mils, a breaking strength of at least about 100 lbs. in the warp direction and at least about 50 lbs. in the fill direction and a tearing strength of at least about 5 lbs. in the warp direction and at least about 3 lbs. in the fill direction.

16. The load-bearing support device of claim 15 wherein the woven fabric is made of natural fibers.

17. The load-bearing support device of claim 18 wherein the natural fibers are cotton fibers.

18. The load-bearing support device of claim 15 wherein the adhesive layer has a thickness of about 7 mils to about 15 mils.

19. The load-bearing support device of claim 15 wherein the tensile strength of the fabric backing member is about 93 lbs. per inch in the warp direction and about 62 lbs. per inch in the cross direction.

20. A load-bearing support device comprising:
a support article and a substantially pliable fabric sheet backing member affixed thereto in a manner so that the pliable fabric sheet backing member has at least one exposed surface which is substantially coated with a layer of moisture activated adhesive that at least partially penetrates the exposed surface, wherein the fabric sheet backing member comprises fibrous material with exposed loose fiber free end portions, at least some of the exposed loose fiber free end portions of the fibrous material being substantially surrounded by the support article and embedded therein, and wherein the fabric sheet backing member has a thickness of at least about 10 mils, a breaking strength of at least about 100 lbs. in the warp direction and at least about 50 lbs. in the fill direction and a tearing strength of at least about 5 lbs. in the warp direction and at least about 3 lbs. in the fill direction.

21. The load-bearing support device of claim 20 wherein the fabric backing member has a thickness of about 26 mils.

* * * * *